(12) United States Patent
Zeludevicius et al.

(10) Patent No.: US 12,474,430 B2
(45) Date of Patent: Nov. 18, 2025

(54) DETECTION DEVICE, SYSTEM AND METHOD FOR DETERMINATION OF INCIDENCE ANGLE OF AN OPTICAL BEAM

(71) Applicant: Valstybinis moksliniu tyrimu institutas Fiziniu ir technologijos mokslu centras, Vilnius (LT)

(72) Inventors: Julijanas Zeludevicius, Vilnius (LT); Giedrius Dubosas, Vilnius (LT)

(73) Assignee: Valstybinis moksliniu tyrimu institutas Fiziniu ir technologijos mokslu centras, Vilnius (LT)

( * ) Notice: Subject to any disclaimer, the term of this patent is extended or adjusted under 35 U.S.C. 154(b) by 241 days.

(21) Appl. No.: 18/199,488

(22) Filed: May 19, 2023

(65) Prior Publication Data
US 2023/0375337 A1 Nov. 23, 2023

(51) Int. Cl.
*G01S 3/783* (2006.01)
*G01B 11/27* (2006.01)
*G01S 3/78* (2006.01)

(52) U.S. Cl.
CPC ............ G01S 3/783 (2013.01); G01B 11/272 (2013.01); *G01S 3/7803* (2013.01)

(58) Field of Classification Search
CPC ...... G01B 11/272; G01S 3/7803; G01S 3/783
See application file for complete search history.

(56) References Cited

U.S. PATENT DOCUMENTS

| | | | |
|---|---|---|---|
| 4,256,405 A | * | 3/1981 | Fjarlie ................... G01J 3/0232 356/330 |
| 4,682,024 A | | 7/1987 | Halldorsson et al. |
| 4,806,750 A | | 2/1989 | Vincent |
| 4,946,277 A | | 8/1990 | Marquet et al. |
| 5,243,179 A | | 9/1993 | Bjorkman |
| 6,122,301 A | | 9/2000 | Tei et al. |

(Continued)

FOREIGN PATENT DOCUMENTS

| | | | |
|---|---|---|---|
| CA | 2016685 A1 | 11/1991 | |
| CN | 110045448 B | * 1/2023 | ............ G01J 1/0488 |

(Continued)

OTHER PUBLICATIONS

European Search Report issued by the European Patent Office in connection with International Application No. 23151967.9, dated Oct. 12, 2023.

*Primary Examiner* — Michael A Lyons
(74) *Attorney, Agent, or Firm* — Carter, DeLuca & Farrell, LLP; George Likourezos

(57) ABSTRACT

The invention relates to the fields of optical technologies and telecommunication technologies, and is dedicated to determination of the direction of optical beam in free-space optical communication systems. The invention is based on the property of interference optical filters (IOF), that transmittance and reflectance of such filters, for a beam with given optical spectrum, depends on the angle of the beam with respect to IOF surface normal. According to the proposed method, at least one IOF is used, which is rotated by defined angle with respect to the optical axis of the detection device. In the implementation of the detection device with one IOF, two optical power detectors are used, which measure optical power of the beam reflected from the IOF and transmitted through the IOF.

16 Claims, 4 Drawing Sheets

(56) References Cited

U.S. PATENT DOCUMENTS

| | | |
|---|---|---|
| 2004/0105098 A1 | 6/2004 | Rella et al. |
| 2008/0266553 A1 | 10/2008 | Scott et al. |
| 2012/0206735 A1 | 8/2012 | Rutten |
| 2020/0011995 A1 | 1/2020 | Send et al. |

FOREIGN PATENT DOCUMENTS

| | | | |
|---|---|---|---|
| EP | 3404379 A1 * | 11/2018 | ............ G01J 1/0492 |
| FR | 2420144 B1 | 6/1982 | |
| JP | 110176910 A | 6/1998 | |

* cited by examiner

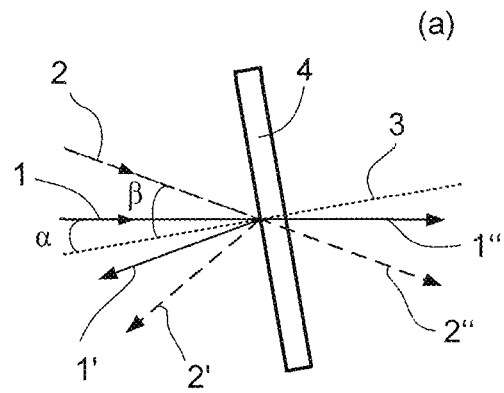
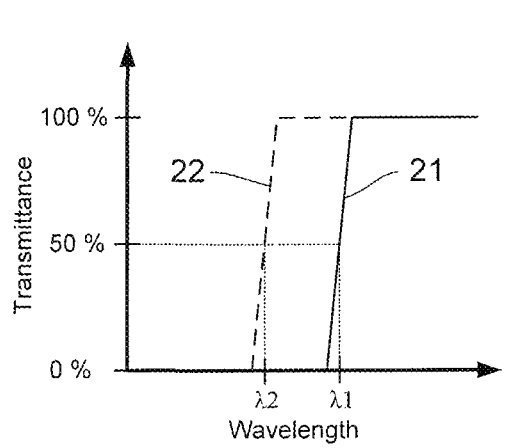
Fig. 1a
Fig. 1b
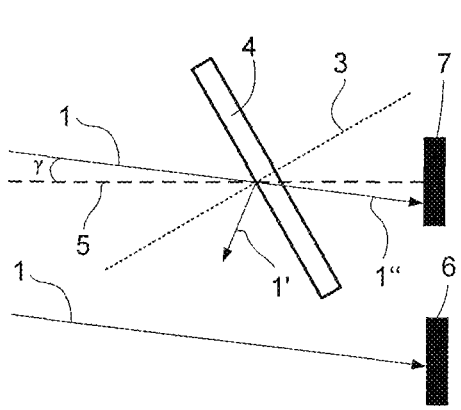
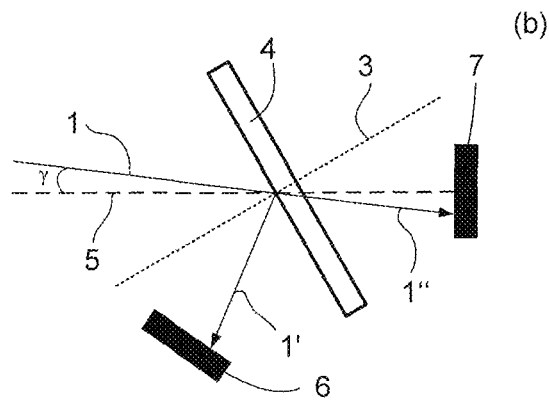
Fig. 2a
Fig. 2b
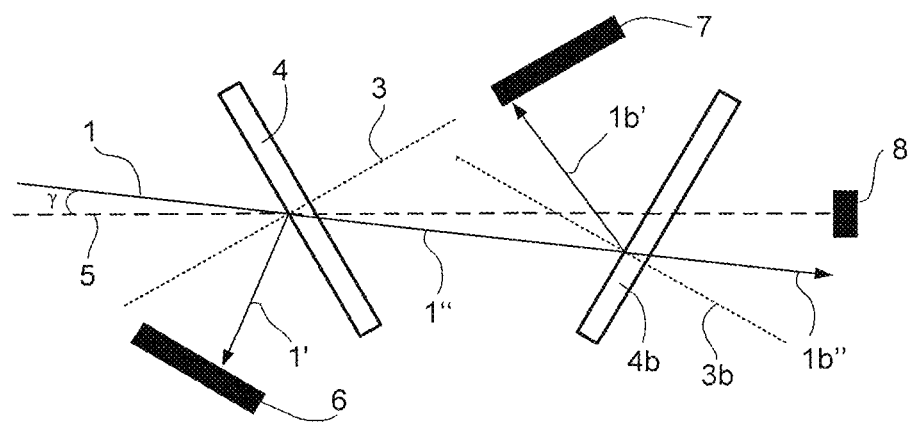
Fig. 3

DETECTION DEVICE, SYSTEM AND METHOD FOR DETERMINATION OF INCIDENCE ANGLE OF AN OPTICAL BEAM

TECHNICAL FIELD OF THE INVENTION

The invention relates to the fields of optical technologies and telecommunication technologies and is dedicated to the detection of the angle of incidence of an optical beam in free-space optical communication systems. In such systems, evaluation of the incidence angle of the optical beam is required for optimal pointing direction alignment between transmitter and receiver, which allows coupling of the optical signal into the detector of the receiver and ensures the transmission of data.

BACKGROUND OF THE INVENTION

In free-space optical communication, the optical beam, which reaches the receiver, is usually spread out in space. Part of this beam overlaps with the aperture of the receiver, is collected by the optical system, and directed towards the optical detector (usually a photodiode). However, high-speed detectors (with an operational frequency bandwidth of 1 GHz and above) have a very small active region (<100 µm), so only the optical beam incident to the receiver aperture at defined angles can be fully coupled to the detector (the direction of the beam is entirely defined by two angles lying in mutually perpendicular planes). In order for the receiver to adjust its aiming angles according to the direction of the incoming optical beam, a system is required, which determines the direction, or angles of the incoming beam, relative to the optical axis of the detection system. Several known techniques are used to accomplish this task, which have some drawbacks.

The most widely used method is implemented using a lens and a CCD or CMOS technology sensor, consisting of an array of light-sensitive elements. This method allows determining unambiguously the direction of the beam (angles in both planes) since data signals corresponding to the entire field of view of the sensor are acquired simultaneously. A known device utilizing this principle is described in Japan patent application JPH10176910A, 1998. However, this method has several drawbacks. First of all, array sensors are complex devices operating only in specific spectral ranges. Si technology sensors—from 300 nm to 1100 nm, InGaAs technology sensors—from 950 nm to 2550 nm. Another disadvantage of this method is the slow response of such sensors (usually 100-300 Hz, depending on the number of active elements) and very large amounts of information that need to be processed so that the beam direction can be determined. All this leads to the complexity of such systems, high energy consumption and, at the same time, requires considerable heat dissipation.

Another known method is implemented using a lens and a lateral effect photodiode. Such photodiodes have one common contact (cathode) and two or three separate terminals (anodes). Photodiodes with two anodes allow to determine the beam position along one coordinate axis, and photodiodes with four anodes allow to determine the beam position in the whole plane. Photocurrent generated by the photodiode depends on the transverse position where the optical beam hits the surface of the sensor: the more the beam moves towards one edge, the higher current is registered at the pin corresponding to this edge. In this way, the beam position on the active photodiode area can be determined by measuring current differences between all terminals. A known device utilizing this principle with a two-anode-terminal photodiode is described in Canada patent application CA2016685A1, 1991. Using such photodiodes, the beam direction detection does not depend on beam optical power (above the minimum level) and the irradiance distribution of the beam. However, the main disadvantage of such a method is that such photodiodes are rather complex devices and are manufactured optimized for certain spectral regions. According to available data, only detectors operating in the spectrum regions from 300 nm to 1100 nm are commercially available.

Another known method is implemented using a lens or aperture and a segmented photodiode. Photodiodes with 4 segments are used to determine beam angles in two mutually perpendicular planes. Such photodiodes are also called quad detectors and consist of 4 independent active areas. The beam incident on the detector must have certain optimal dimensions to overlap with each segment partially. An optical system consisting of lenses and/or optical apertures is used to achieve that. The photocurrent signals generated by each segment (which are proportional to the optical power of the beam) are measured. Depending on the beam position in relation to these segments, signal levels generated by the segments change, and from that the position of the beam can be determined. A known device utilizing this principle, in which a lens is used, is described in French patent FR2420144B1, 1982. Another known device, which uses an aperture, is described in US patent application U.S. Pat. No. 4,946,277A, 1990. The disadvantage of this method is that segmented photodiodes are produced using Si and InGaAs semiconductor technologies, so their operational spectral region is limited. Available detectors are optimized for the spectral range from 300 nm to 1100 nm or from 900 nm to 1700 nm. Another disadvantage of this method is that the response of such detectors (signal dependence on the beam angles) also depends on the beam irradiance distribution. As the optical beam propagates through the atmosphere at long distances, it is distorted by the turbulence, so the irradiance distribution, which reaches the receiver, can be strongly non-Gaussian and variable in time, which introduces beam pointing detection errors using a 4-segment detector.

The closest prior art by technical purpose and implementation is the detection device for determination of the angle of incidence of the optical beam described in British patent application GB0521253D0, 2005. The known device includes two optical power detectors and an optical element characterized by the dependence of its transmittance on the incidence angle of the optical beam. Such an element is installed in front of at least one of the optical detectors. The mentioned element can be an optical interference filter (OIF), whose spectral response changes depending on the angle of incidence of the beam. When detecting an optical beam whose spectrum is predetermined and constant, the beam angle with respect to normal to OIF is determined by comparing optical power levels detected by both detectors.

The description of the mentioned invention includes a detection method of the incidence angle of the optical beam when the optical spectrum of the optical beam is predefined and constant. A known method involves directing the optical beam to the optical interference filter (OIF), which optical transmission depends on the angle of incidence of the beam to the OIF and the estimation of the angle of incidence of the optical beam according to the comparison of the optical power of the optical beam that passes through the OIF and the optical power of the optical beam that does not pass through the OIF.

The known detection device and detection method have the following disadvantage. Since the optical element is not oriented at a certain angle, the same value of the detected angle represents a set of the beam directions corresponding to the same angle relative to the surface normal of the optical interference filter. This would correspond to a "ring" of directions in the far field. In other words, the known device and detection method allows determining of the angle by which the beam deviates from the surface normal of the optical interference filter but does not give information in which direction it deviates. So, the determination of the angle of incidence of the optical beam by known detection device and method is not accurate.

Technical Problem to be Solved by the Present Invention

The present invention aims to increase the accuracy of the determination of the angle of incidence of the optical beam and to expand the range of possible applications.

DISCLOSURE OF THE ESSENCE OF THE INVENTION

In order to solve the above problem according to the proposed invention, a detection device for determination of the angle of incidence of an optical beam, when the optical spectrum of the optical beam is predefined and constant, comprises at least two detectors of optical power, at least one optical interference filter (OIF) placed in the path of the optical beam, wherein optical transmission of the OIF depends on the incidence angle of the optical beam to the OIF surface and angle of incidence with respect to the optical axis of a detection device is determined by comparison of the optical power of the optical beams, wherein mentioned OIF(s) is/are rotated by a predefined angle with respect to the optical axis of the detection device in the detection plane, in which lies the optical axis of the detection device and OIF surface normal, wherein incidence angle of the optical beam, with respect to the optical axis of the detection device is determined by comparing optical power of the optical beam(s), which is/are transmitted through OIF(s) and/or reflected from the OIF(s) surface(s).

According to the present invention one of particular embodiments is the detection device, which has one OIF rotated by a predefined angle in the detection plane with respect to the optical axis of the detection device, and two detectors and, wherein the first detector is placed in the path of the optical beam reflected from the OIF surface and measures optical power P1 of the beam reflected from OIF, and the second detector is placed in the path of the optical beam transmitted through OIF and measures optical power P2 of the beam transmitted through OIF.

According to the present invention other of particular embodiments is the detection device which has two OIFs arranged sequentially one after the other and are rotated by predefined angles in the detection plane with respect to the optical axis of the detection device, wherein the first detector is placed in the path of the optical beam reflected from the surface of the first OIF, and the second detector is placed in the path of the optical beam reflected from the second OIF or in the path of the optical beam transmitted through the second OIF.

The first OIF and the second OIF are rotated by equal angles in opposite directions, wherein the first detector measures optical power P1 of the beam reflected from the first OIF, and the second detector measures optical power P2 of the beam reflected from the second OIF.

The first OIF and the second OIF are rotated by equal angles in the same direction, wherein the first detector measures optical power P1 of the beam reflected from the first OIF, and the second detector measures optical power P2 of the beam transmitted through the second OIF.

Mentioned incidence angle of the optical beam with respect to the optical axis of the detection device is determined by the ratio of optical power using the formula (P1−P2)/(P1+P2), where P1 is the optical power of the optical beam reflected from the first OIF, and P2 is the optical power of the optical beam transmitted through the first OIF or P2 is the optical power of the optical beam transmitted through or reflected from the second OIF.

According to another embodiment of the present invention is a system for determination of the angles of incidence of an optical beam in two planes, which comprises two detection devices, which are aligned in two mutually perpendicular planes, wherein the optical beam pointing direction of which is being detected, is divided by a beam splitter into two parts, wherein the first part is directed to the first detection device, which has OIF rotated in XY plane, and which determines beam angle in the XY plane, and the second part of the optical beam is directed by the beam splitter to the second detection device, which has OIF rotated in XZ plane, and which determines beam angle in the XZ plane. According to yet another embodiment the of the present invention is a system for determination of the angles of incidence of an optical beam in two planes, which comprises two detection devices, which are aligned in two mutually perpendicular planes, wherein the optical beam, pointing direction of which is being detected, enters first detections device, which has OIF rotated in XY plane, and which determines beam angle in the XY plane, and the optical beam transmitted through the first detection device enters the second detection device, which has OIF rotated in XZ plane, and which determines beam angle in the XZ plane.

According to the present invention other particular embodiment the system is provided with λ/4 wave plate, which is dedicated to converting circularly polarized beam to linearly polarized beam, which hits the first OIF.

According to the present invention yet other particular embodiment the system is provided with an additional laser source with stable spectrum, which has its output beam directed to the first OIF by a beam splitter, and which is dedicated for calibration of optical power detectors.

According to another embodiment of the present invention is a detection method for determination of the angle of incidence of an optical beam when the optical spectrum of the mentioned optical beam is predefined and constant, comprising:

directing of the optical beam to at least one optical interference filter (OIF) of the detection device, whose transmittance depends on the incidence angle of the optical beam to OIF, determination of the incidence angle of the optical beam according to the comparison of the optical power of optical beams, wherein mentioned OIF(s), to which the optical beam is directed, is/are rotated by a predefined angle with respect optical axis of the detection device in the detection plane, in which lies the optical axis of the detection device and OIF surface normal, and incidence angle of the optical beam, with respect to the optical axis of the detection device, is determined by comparing optical power of the optical beam(s) transmitted through OIF and/or reflected from OIF surface(s).

Advantages of the Invention

The advantage of the proposed detection device and method, compared to the closest analogue in terms of technical purpose and design, is that by using the proposed detection device and method, significantly higher accuracy of angle determination is obtained because the OIFs are rotated by a predefined angle with respect to the optical axis of the detection device (system). This allows unambiguous determination of the optical beam angle with respect to the optical axis of the detection device (system) in one plane. By using a system with two detectors and OIFs rotated in two mutually perpendicular detection planes, complete information about the beam-pointing direction can be unambiguously determined.

BRIEF DESCRIPTION OF THE DRAWINGS

The invention is explained in more detail by the drawings, which do not limit the scope of the invention, and which depict the following:

FIG. 1a shows an optical interference filter (OIF) and two optical beams incident on the surface of the OIF at different angles, and the optical beams that have passed through and reflected from the OIF.

FIG. 1b shows the OIF spectral response for the incident optical beams according to FIG. 1.

FIGS. 2a and 2b show a detection device with one OIF, which is rotated at a fixed angle with respect to the optical axis of the detection device, and two detectors, wherein in FIG. 2a one of the detectors measures optical power of the beam incident to the OIF, and the other detector measures optical power of the beam transmitted through OIF and in FIG. 2b one of the detectors measures optical power of the beam reflected from the OIF, and the other detector measures optical power of the beam transmitted through OIF.

FIG. 3 shows a detection device with two OIFs rotated by equal angles in opposite directions with respect to the optical axis of the detection device and two detectors placed in the corresponding paths of the optical beams reflected from different OIFs.

INVENTION IMPLEMENTATION EXAMPLES

Figure 4:
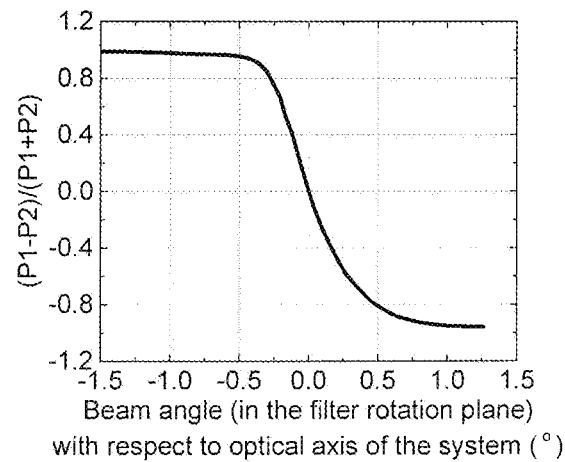
FIG. 4 shows the experimentally measured dependence of the optical beam angle determination response on the actual beam angle with respect to the optical axis of the detection system for the angle determination system implementation with two OIFs (which is shown in FIG. 3).

In FIG. 1a, two optical beams, 1 and 2, are shown, which propagate at different angles α and β with respect to the surface normal 3 of the optical interference filter (OIF) 4. This drawing also shows the incident beam 1, reflected from the OIF 4 beam 1', and transmitted through the OIF 4 beam 1", as well as incident beam 2, reflected from OIF 4 beam 2' and transmitted through OIF 4 beam 2".

FIGS. 2a and 2b show the implementation of the incidence angle γ detection device of the optical beam 1 with respect to the optical axis 5 of the detection device, in one plane, in which lies the optical axis of the detection device and surface normal 3 of the OIF. In this implementation, one OIF 4 is used, which is rotated by an angle with respect to the optical axis 5 of the detection device. In FIG. 2a, part of the incident optical beam 1 is directed to the optical power detector 6, whereas transmitted through OIF 4 beam 1" is directed to the optical power detector 7. In FIG. 2b, reflected from OIF 4 beam 1' is directed to the optical power detector 6, whereas transmitted through OIF 4 beam 1" is directed to the optical power detector 7.

FIG. 3 shows another implementation of the incidence angle γ detection device of the optical beam 1 with respect to the optical axis 5 of the detection device, in one plane, in which lies the optical axis of the detection device and surface normal 3 of the OIF. In this implementation, two optical interference filters 4 and 4b are used, which are rotated by an angle with respect to the optical axis 5 of the detection device. Reflected from OIF 4 optical beam 1' is directed to detector 6, whereas transmitted through OIF 4 beam is directed to OIF 4b. Reflected from OIF 4b beam is directed to detector 7. In addition, receiver detector 8 is shown, which can be mounted straightaway after OIF 4b in the path of optical axis 5.

Figure 7:
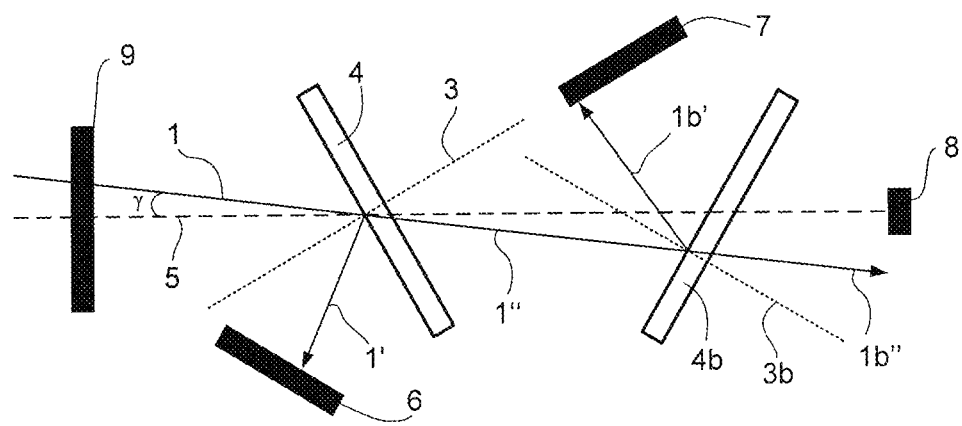
FIG. 7 shows the detection device, according to FIG. 3, with an additional λ/4 wave-plate for polarization alignment.

FIG. 7 shows the implementation of the incidence angle detection device of the optical beam with respect to the optical axis 5 of the detection device in one plane, using two optical interference filters according to FIG. 3 and additional λ/4 wave-plate 9 for polarization alignment.

Figure 8:
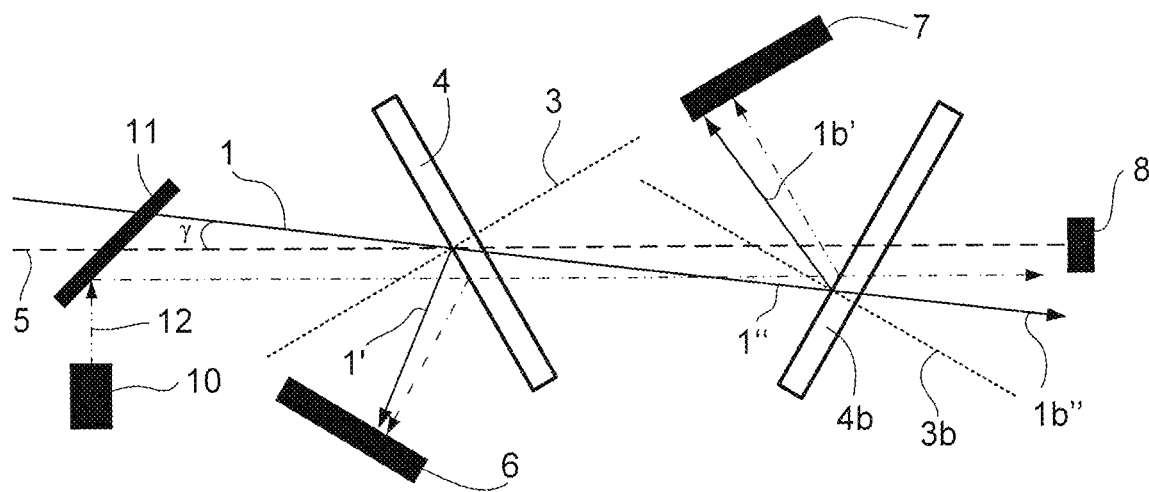
FIG. 8 shows the detection device, according to FIG. 3, with an additional beam splitter and laser source, which are used for calibration of the response of the photodiodes.

FIG. 8 shows the implementation of the incidence angle detection device of the optical beam with respect to the optical axis 5 of the detection device in one plane, using two optical interference filters according to FIG. 3, with an additional stable spectrum laser source 10 dedicated for the calibration of the optical power detectors 6 and 7, i.e. for the calibration of the OIF response, the optical beam 12 from the laser source 10 is directed to the first OIF 4 through the beam splitter 11.

Figure 9:
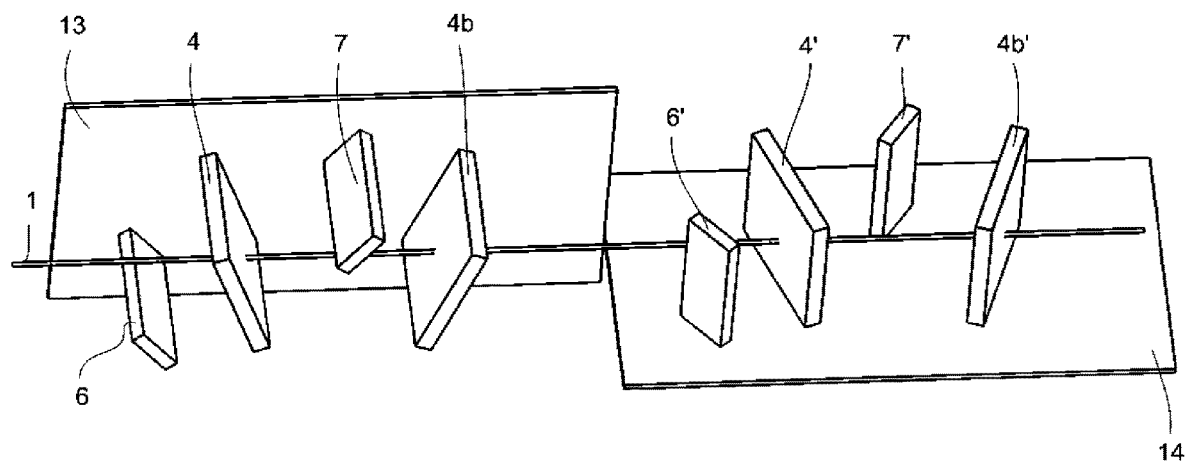
FIG. 9 shows the implementation of the optical beam angle detection system for beam angle determination in two planes with respect to the optical axis of the detection device, which consists of two detection devices according to FIG. 3 sequentially arranged and oriented in mutually perpendicular planes.

FIG. 9 shows a system for the determination of the angles of incidence of the optical beam in two planes, comprising two detection devices according to FIG. 3, which are oriented in mutually perpendicular planes, wherein the optical beam 1, whose direction is being determined, initially enters the first detection device according to FIG. 3, whose OIFs are rotated in the XY plane, and which determines the beam angle in the XY plane, and the optical beam after passing the first detection device enters the second detection device according to FIG. 3, whose OIFs are rotated in the XZ plane, and which determines the beam angle in the XZ plane.

Figure 10:
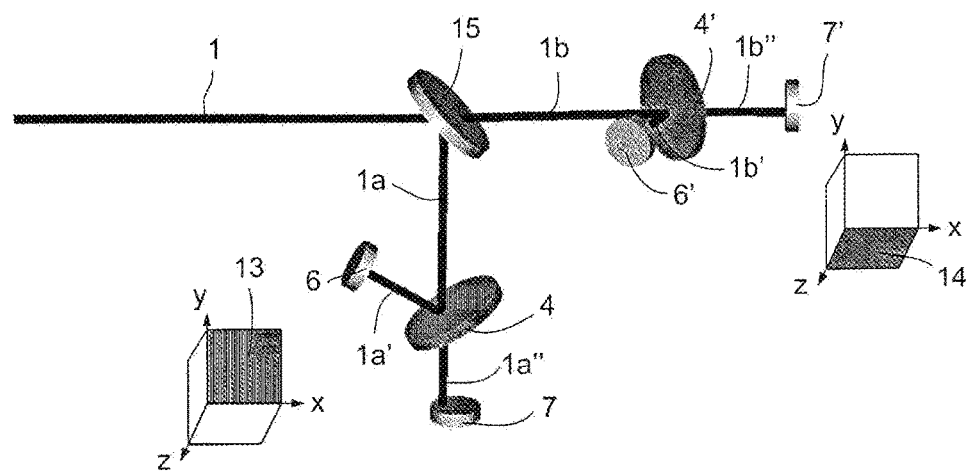
FIG. 10 shows the implementation of the optical beam angle detection system for beam angle determination in two planes with respect to the optical axis of the detection device, which consists of two detection devices according to FIG. 2b, which are oriented in mutually perpendicular planes.

FIG. 10 shows a system for the determination of the angles of incidence of the optical beam in two planes, comprising two detection devices according to FIG. 2b, which are oriented in mutually perpendicular planes, wherein the optical beam 1, whose direction is being determined, is split using a beam splitter 15 into two parts 1a and 1b, which enter two realizations of the beam angle detection with one OIF, corresponding to the depicted in FIG. 2b, but orientated in mutually perpendicular planes XY 13 and XZ 14. One part of the beam, which is denoted as 1a, enters the first one-OIF 4 realization orientated for angle determination in the XY plane 13, and the other part 1b enters the second one-OIF 4' realization oriented for angle determination in the XZ plane 14. Both single-OIF angle detection realizations have two power detectors each. Detectors 6 and 6' measure the optical power of the optical beams (1a', 1b') reflected from the filters (4, 4'), and detectors 7 and 7' measure the optical power of the optical beams (1a", 1b") transmitted through the filters (4, 4').

DETAILED DESCRIPTION OF THE INVENTION

The proposed invention is based on the property of optical interference filters (OIF) that the spectral response of the OIFs depends on the incident angle of an optical beam with respect to the filter surface normal. For the implementation of the invention, certain OIFs are required, characterized by a linear or close to the linear dependence of the reflectance (and transmittance) on the wavelength—the spectral slope. Hereinafter, the term optical interference filter (OIF) refers to an OIF having at least one spectral slope. Such OIFs are composed of many thin layers, the thicknesses of which are optimized so that optical radiation of certain wavelengths experiences constructive or destructive interference and is reflected or transmitted by the filter. Typically, OIFs are used in laser systems as dichroic mirrors, which allow splitting or combining optical beams according to their spectral components. When the angle of incidence of the optical beam to the OIF surface changes, the effective thicknesses of the layers, through which the optical beam passes, change, which leads to a certain change in the spectral characteristics. In practice, this means that when the incidence angle (i.e. the angle between the incident beam and the OIF surface normal) is increased, the OIF response shifts down the wavelength scale towards shorter wavelengths. For a long-pass OIF, this is illustrated in FIG. 1. FIG. 1a. shows configuration when beam 1 is incident on the surface of the filter 4 at angle α, and beam 2 is incident at angle β, when the angles are such that α<β.

Depending on the wavelength of optical radiation, part of the incident beam can be reflected (1' and 2'), while the other part is transmitted through the OIF (1" and 2"). FIG. 1b. represents the wavelength spectral response of the OIF. For optical beam 1 incident at angle α, its response is labelled 21, and the 50% transmission wavelength is λ1. For an optical beam incident at angle β, its response is labelled 22, and the 50% transmission wavelength is λ2. We see that λ1>1 λ2, so the "slope" of the OIF shifts in the wavelength domain.

In the present invention, the aforementioned property of optical interference filters is utilized for optical beam direction determination. Since the spectrum of laser radiation can be precisely measured and is constant in time, the angle-dependent change in the spectral response of the OIF can be converted to a change in optical power, which can be measured using any optical power detector. From these measurements, beam angle change with respect to the OIF surface normal can be determined.

Unlike the closest known analogue, the present invention proposes a method for determining the angle of the optical beam using OIFs when one or more OIFs are rotated by a predefined angle with respect to the optical axis of the detection system. The angle of the beam with respect to the optical axis of the system is determined in the detection plane, in which the optical axis of the system and the OIF surface normal are located. Meanwhile, the angle of the beam in the plane perpendicular to the detection plane has almost no influence on the measurement results. The second system of one or more filters oriented in the perpendicular plane can be used to measure the beam angle in a perpendicular plane. In this way, the proposed method and the system based on it provide complete information about the direction of the beam in relation to the optical axis of the detection system (how much and in what direction the beam deviates from the optical axis of the detection system).

For the implementation of the invention, it is sufficient that the OIF spectral response has at least one slope. It does not really matter whether it is a long-pass OIF, a short-pass OIF, or a band-pass OIF. However, the central wavelength of the spectrum of the detected beam must be such, and the rotation of the OIF is adjusted so, that when incidence angle of the beam to the OIF corresponds to the optical axis of the detection system, the central wavelength of the received beam should correspond to a certain point on the spectral slope of the OIF. In the optimal case, when one wants to measure the change of incidence angle in both the ascending and descending directions, it should be the middle of the OIF spectral slope. When applying the described method, depending on the bandwidth of the spectrum of the laser beam, two variations of the reflection (or transmittance) response depending on the incidence angle are possible:

1) When the bandwidth of the spectrum of the laser beam is much narrower than the width of the spectral slope of the filter. In this case, the angular response is determined only by the spectral slope characteristics (width) of the filter.
2) When the bandwidth of the spectrum of the laser beam is comparable to or greater than the width of the spectral slope of the filter. In this case, the angle response is affected by the spectrum of the laser beam itself and its shape.

To illustrate embodiments of the invention, it is assumed that a nearly collimated beam enters the beam angle detection device. Nearly collimated beam at the receiver aperture can be assumed when there is significant distance between the transmitter and the receiver. Alternatively, incident beam can be formed by an optical telescope converting a large-diameter beam from a receiving aperture into a beam with a diameter of one to several millimeters. This is a common system configuration for receiving an optical signal over long distances, e.g. from a satellite. First, examples of a system implementation for determining the beam angle in one plane are presented. Angle determination in both planes is achieved by combining two realizations of angle determination in one plane, which are oriented in mutually perpendicular planes.

The most straightforward implementation of the proposed method for determination of the beam angle change in one plane is using only one optical interference filter 4 and two detectors 6 and 7 with a large active area and sensitive to optical radiation (e.g. photodiodes) as illustrated in FIG. 2a and FIG. 2b. There are two possible embodiment modifications with respect to placement of the detectors. In the first possible embodiment, which is most suitable for large diameter incident beams, detector 6 measures total optical power P1a of the incident beam 1 and detector 7 measures optical power P2 of the beam 1" transmitted through OIF (FIG. 2*a*). In the second possible embodiment, detector 6 measures optical power P1 of the beam 1' reflected from OIF surface and detector 7 measures optical power P2 of the beam 1" transmitted through OIF (FIG. 2*b*). The angle of rotation of the filter and the wavelength of the incident radiation are selected in such a way that at the angle of incidence of the beam corresponding to the optical axis of the detection system 5, part of the incident beam is reflected by the filter and part passes through. Ideally, 50% of the incident beam optical power should be reflected and the remaining 50% transmitted. However, the ratio may differ depending on other system parameters (if a wide detection angle interval is not required). To determine the angle, the ratio P2/P1a in the first embodiment, or ratio (P1−P2)/(P1+P2) in the second embodiment is calculated, which does not depend on the optical power of the incident beam, but defines the angle of the beam with respect to the OIF surface normal 3, and at the same time, with respect to the optical axis of the detection system 5. Such implementation of this method is straightforward; it requires only one optical interference filter for angle determination in one plane.

Figure 5:
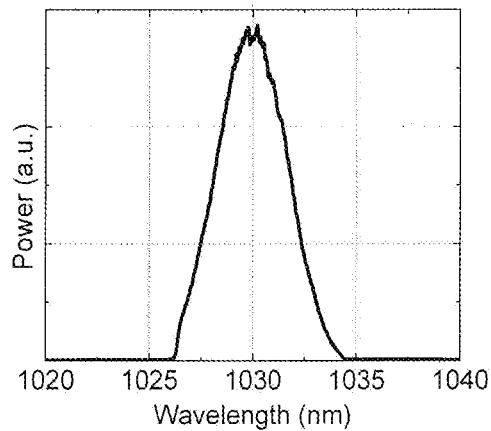
FIG. 5 shows the optical wavelength spectrum of the optical beam used for the angle determination experiment.
Figure 6:
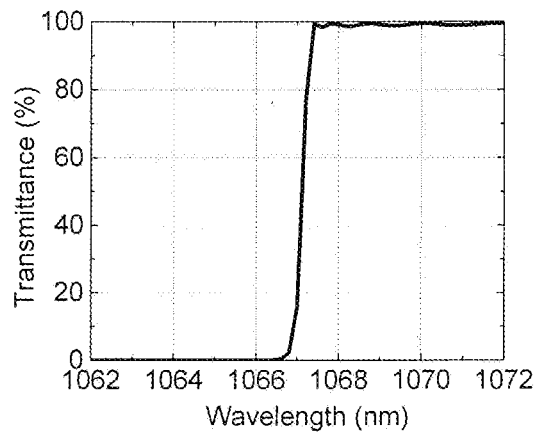
FIG. 6 shows the spectral response of the OIF at 0° angle of incidence of the beam to the OIF, which was used for the angle determination experiment.

Another, more improved realization of the method, is using two identical OIFs rotated by equal angles in opposite directions, as shown in FIG. 3. To determine the change in the incidence angle of beam 1 (with respect to the optical axis 5 of the detection system), the optical power reflected from OIF 4 and 4*b* is measured. Detector 6 measures optical power P1 reflected from OIF 4, and detector 7 measures optical power P2 reflected from OIF 4*b*. To ensure the broadest possible range of angle detection, the OIF and the beam wavelength must be matched in such a way that at a beam angle corresponding to the optical axis 5 of the detection system, 50% of the incident optical power is reflected from each of the OIFs. However, this condition is not critical. A lower reflection percentage can be selected if it is desired that, at the optimal beam direction, more optical power passes through the OIF and is directed to the receiver detector 8, which can be installed immediately after the OIF 4*b*. The parameter (P1−P2)/(P1+P2), which does not depend on the optical power of the incident beam, is calculated for the determination of the angle (with respect to the optical axis 5 of the detector). Compared to the one-OIF implementation, the main advantage of the two-OIF implementation is that the beam transmitted through the filters can be utilized, for example, by directing it to the receiver detector for data reception. An exemplary response, achieved by implementing the presented realization experimentally and using available optical interference filters, is shown in FIG. 4. The spectrum of the optical beam, which was used in this case, is shown in FIG. 5. The spectral response of the OIF at a beam incidence angle of 0° is plotted in FIG. 6. The OIFs were optimized to reflect 30% of the optical power of the incident beam.

It is known that the response of the optical interference filters can depend on the polarization of the optical beam. Previously mentioned implementations work well when the polarization of the optical beam is linear and orientated parallel or perpendicular to the plane of incidence to the OIF. However, in real systems, it can be challenging to ensure that the polarization orientation transmitted by the transmitter does not change as the receiver and/or transmitter moves. In such cases, two solutions are possible:

1) Use a non-polarized optical beam from the transmitter and a polarizer before the filters so that the angle detection is optimized for single polarization, and the beam with perpendicular polarization is simply blocked.
2) Use a circularly polarized optical beam from the transmitter and a λ/4 wave-plate in front of the angle detection device (FIG. 7). In this case, the λ/4 wave-plate 9 is rotated so that the polarization of the beam entering the beam angle determination device is linear and orientated parallel or perpendicular to the plane of incidence to the OIF.

If photodiodes are used for optical power measurement in the angle detection device, it may happen that due to temperature influence or ageing, a difference will appear in the power measurement readings between the two photodiodes. The resulting imbalance can affect the angle determination characteristics and introduce errors. In such cases, a modified implementation of the device can be used, in which a stable spectrum laser source 10 is additionally integrated (FIG. 8). The wavelength of the laser source 10 is chosen such that approximately 50% of the optical power of the incident beam is reflected from both filters 4 and 4*b*. A beam 12 of an additional laser source 10 can be directed to the angle determination device using a beam splitter 11. When photodiode calibration is needed, such a source would be turned on, and the power ratio detected by detectors 6 and 7 would be measured. A correction factor for the angle determination could be calculated using the measured ratio of optical power readings. In this way, accurate angle determination could be ensured even during changes in the response of the detectors (6 and 7).

In order to fully determine the direction of the beam (determine two values of incidence angle with respect to the optical axis of the device), the angle measurements must be performed in two mutually perpendicular planes. The realization of the invention intended for this purpose is made by applying two realizations for the determination of the angle in one plane. One of them is orientated so that the filters are rotated (and the angle of the beam is determined) in the XY plane 13, and the other is orientated so that the filters are rotated in the XZ plane 14 (the denotations of the planes are chosen assuming that the direction of propagation of the beam corresponds to the X axis). A corresponding illustration of an embodiment of the invention for determination of the beam angle change in two planes using two-OIF realizations is given in FIG. 9. In this case, a sequential arrangement of beam angle detection realizations may be applied, where the angle in the XY plane 13 is initially determined, and the transmitted beam is then used for determination of the angle in the XZ plane 14.

When one needs to determine beam angles in two planes with one OIF per plane, a parallel arrangement of beam angle detection realizations must be used (FIG. 10). In this case, the incident beam 1 is split using a beam splitter 15 into two parts 1*a* and 1*b*, which enter two realizations of the beam angle detection with one OIF, corresponding to the depicted in FIG. 2*b*, but orientated in mutually perpendicular planes XY 13 and XZ 14. Thus, one part of the beam 1*a* enters the first one-OIF 4 realization orientated for angle determination in the XY plane 13, and the other part 1*b* enters the second one-OIF 4' realization oriented for angle determination in the XZ plane 14. Both single-OIF angle detection realizations have two power detectors each 6, 7 and 6', 7', which measure the optical power of the beam reflected from the filter (1*a*', 1*b*') and the beam transmitted through the filter (1*a*", 1*b*"). According to the readings of these optical power detectors, the value of the angle of the beam with respect to the optical axis of the system is determined separately in the XY plane and the XZ plane by using the previously mentioned formula.

The invention claimed is:

1. A detection device for determination determining an angle of incidence of an optical beam when an optical spectrum of the optical beam is predefined and constant, comprising:
at least two detectors of optical power, and
at least one optical interference filter (OIF) placed in a path of the optical beam,
wherein optical transmission of the at least one OIF depends on an incidence angle of the optical beam to a surface of the at least one OIF,
wherein the angle of incidence with respect to an optical axis of the detection device is determined by comparison of the optical power of the optical beams,
wherein a first OIF and a second OIF of the at least one OIF is/are rotated by a predefined angle with respect to the optical axis of the detection device in a detection plane,
wherein the incidence angle of the optical beam, with respect to the optical axis of the detection device is determined by comparing optical power of the optical beam(s), which is/are transmitted through the at least one OIF and/or reflected from the at least one OIF, and
wherein a receiver detector is positioned directly after the second OIF along the optical axis to receive the optical beam transmitted through the second OIF.

2. The detection device according to claim 1, wherein the at least one OIF is rotated by a predefined angle in the detection plane with respect to the optical axis of the detection device, and a first detector and a second detector, wherein the first detector is placed in the path of the optical beam reflected from the at least one OIF and measures optical power P1 of the optical beam reflected from the at least one OIF, and the second detector is placed in the path of the optical beam transmitted through the at least one OIF and measures optical power P2 of the optical beam transmitted through the at least one OIF.

3. The detection device according to claim 2, wherein the first OIF and the second OIF are arranged sequentially and are rotated by predefined angles in the detection plane with respect to the optical axis of the detection device, wherein the first detector is placed in the path of the optical beam reflected from a surface of the first OIF, and the second detector is placed in the path of the optical beam reflected from the second OIF or in the path of the optical beam transmitted through the second OIF.

4. The detection device according to claim 3, wherein the first OIF and the second OIF are rotated by equal angles in opposite directions, wherein the first detector measures optical power P1 of the beam reflected from the first OIF, and the second detector measures optical power P2 of the beam reflected from the second OIF.

5. The detection device according to claim 3, wherein the first OIF and the second OIF are rotated by equal angles in the same direction, wherein the first detector measures optical power P1 of the beam reflected from the first OIF, and the second detector measures optical power P2 of the beam transmitted through the second OIF.

6. The detection device according to claim 2, wherein $\lambda/4$ waveplate is provided, which is dedicated to converting a circularly polarized beam to a linearly polarized beam, which hits the first OIF.

7. The detection device according to claim 2, wherein a laser source with stable spectrum is provided, which has its output beam directed to the first OIF by a beam splitter, and which is dedicated for calibration of the first detector and the second detector.

8. The detection device according to claim 1, wherein the incidence angle of the optical beam with respect to the optical axis of the detection device is determined by a ratio of optical power using the formula $(P1-P2)/(P1+P2)$, where P1 is the optical power of the optical beam reflected from the first OIF, and P2 is the optical power of the optical beam transmitted through the first OIF or P2 is the optical power of the optical beam transmitted through or reflected from the second OIF.

9. A system for determining angles of incidence of an optical beam in two planes, comprising a first detection device and a second detection device, which are aligned in two mutually perpendicular planes,
wherein an optical beam, the optical beam having a pointing direction detected, is divided by a beam splitter into two parts and, wherein a first part is directed to the first detection device, which has a first optical interference filter (OIF) rotated in XY plane, and which determines optical beam angle in the XY plane, and a second part of the optical beam is directed by the beam splitter to the second detection device, which has a second OIF rotated in XZ plane, and which determines optical beam angle in the XZ plane,
wherein a receiver detector is positioned directly after the second OIF along an optical axis to receive the optical beam transmitted through the second OIF.

10. A system for determining angles of incidence of an optical beam in two planes, comprising a first detection device and a second detection device, which are aligned in two mutually perpendicular planes,
wherein an optical beam, the optical beam having a pointing direction detected, enters the first detection device, which has a first optical interference filter (OIF) rotated in XY plane, and which determines optical beam angle in the XY plane, and the optical beam transmitted through the first detection device enters the second detection device, which has a second OIF rotated in XZ plane, and which determines optical beam angle in the XZ plane,
wherein a receiver detector is positioned directly after the second OIF along an optical axis to receive the optical beam transmitted through the second OIF.

11. A detection method for determining an angle of incidence of an optical beam when an optical spectrum of the optical beam is predefined and constant, comprising:
directing of the optical beam to at least one optical interference filter (OIF) of a detection device, whose transmittance depends on an incidence angle of the optical beam to OIF,
determining the incidence angle of the optical beam according to a comparison of optical power of the optical beam and an additional optical beam,
wherein the at least one OIF to which the optical beam is directed, is/are rotated by a predefined angle with respect to an optical axis of the detection device in a detection plane, the optical axis of the detection device and OIF surface normal lying within the optical axis of the detection device, and incidence angle of the optical beam, with respect to the optical axis of the detection device, is determined by comparing optical power of the optical beam and the additional optical beam transmitted through the at least one OIF and/or reflected from the at least one OIF, and wherein a receiver detector is positioned directly after the at least one OIF along the optical axis to receive the optical beam transmitted through the at least one OIF.

12. The detection method according to claim 11, wherein at least one OIF is rotated by a predefined angle in the detection plane with respect to the optical axis of the detection device, wherein a first detector is placed in a path of the optical beam reflected from the at least one OIF and measures optical power P1 of the beam reflected from the at least one OIF, and a second detector is placed in the path of the optical beam transmitted through the at least one OIF and measures optical power P2 of the beam transmitted through the at least one OIF.

13. The detection method according to claim 11, wherein a first OIF and a second OIF are arranged sequentially one after the other and are rotated by predefined angles in the detection plane with respect to the optical axis of the detection device, wherein a first detector is placed in a path of the optical beam reflected from a surface of the first OIF, and a second detector is placed in the path of the optical beam reflected from the second OIF or in the path of the optical beam transmitted through the second OIF.

14. The detection method according to claim 13, wherein the first OIF and the second OIF are rotated by equal angles in opposite directions, wherein the first detector measures optical power P1 of the optical beam reflected from the surface of the first OIF, and the second detector measures optical power P2 of the optical beam reflected from the second OIF.

15. The detection method according to claim 13, wherein the first OIF and the second OIF are rotated by equal angles in the same direction, wherein the first detector measures optical power P1 of the optical beam reflected from the first OIF, and the second detector measures optical power P2 of the optical beam transmitted through the second OIF.

16. The detection method according to claim 13, wherein the incidence angle of the optical beam with respect to the optical axis of the detection device is determined by a ratio of optical power using the formula $(P1-P2)/(P1+P2)$, where P1 is the optical power of the optical beam reflected from the first OIF, and P2 is the optical power of the optical beam transmitted through the first OIF or P2 is the optical power of the optical beam transmitted through or reflected from the second OIF.

* * * * *